United States Patent
Bae et al.

(10) Patent No.: US 7,843,162 B2
(45) Date of Patent: Nov. 30, 2010

(54) CURRENT REGULATOR AND CURRENT CONTROL METHOD AND SYSTEM FOR AC MOTORS

(75) Inventors: Bonho Bae, Torrance, CA (US); Nitinkumar R. Patel, Cypress, CA (US); Steven E. Schulz, Torrance, CA (US); James M. Nagashima, Cerritos, CA (US); Jung Sik Yim, Seoul (KR); Seung Ki Sul, Seoul (KR)

(73) Assignee: GM Global Technology Operations, Inc., Detroit, MI (US)

( * ) Notice: Subject to any disclaimer, the term of this patent is extended or adjusted under 35 U.S.C. 154(b) by 387 days.

(21) Appl. No.: 12/048,071

(22) Filed: Mar. 13, 2008

(65) Prior Publication Data

US 2009/0230900 A1 Sep. 17, 2009

(51) Int. Cl.
*H02P 27/04* (2006.01)
(52) U.S. Cl. .............. 318/801; 318/400.02; 318/400.17
(58) Field of Classification Search .................. 318/801, 318/400.02, 400.17, 727
See application file for complete search history.

(56) References Cited

U.S. PATENT DOCUMENTS

2009/0215586 A1* 8/2009 Kresse ........................ 477/110

OTHER PUBLICATIONS

Kim, H. et al. "A virtual translation technique to improve current regulator for salient-pole AC machines," IEEE 35th Annual Power Electronics Specialists Conference, 2004, pp. 487-493, vol. 1.
Del Blanco, F.B. et al. "Dynamic analysis of current regulators for AC motors using complex vectors," IEEE Transactions on Industry Applications, 1999, pp. 1424-1432, vol. 35.

* cited by examiner

*Primary Examiner*—Karen Masih
(74) *Attorney, Agent, or Firm*—Ingrassia Fisher & Lorenz, P.C.

(57) ABSTRACT

Methods and systems are provided for controlling an AC motor via an inverter. The method includes determining a delay-compensated offset based on a synchronous frame current, producing a current error based on a synchronous frame current and a commanded current, producing a voltage error based on an anti-windup offset and the current error, producing a commanded voltage based on the delay-compensated offset and the voltage error, and providing the inverter with the commanded voltage.

20 Claims, 3 Drawing Sheets

US 7,843,162 B2

CURRENT REGULATOR AND CURRENT CONTROL METHOD AND SYSTEM FOR AC MOTORS

TECHNICAL FIELD

The present invention generally relates to controlling alternating current (AC) motors, and more particularly relates to apparatus, systems and methods for current control of AC motors.

BACKGROUND OF THE INVENTION

Synchronous frame current regulators are commonly used for current control of AC motors, such as three-phase electric motors. By providing dynamic control over a wide frequency range, synchronous frame current regulators are suited to many industrial applications. In digital implementations of conventional current regulators, as the ratio of the sampling frequency to the fundamental frequency, or synchronous frequency, of the AC motor decreases, the stability of these current regulators tends to decrease. For example, delays in digital implementation, increased sub-harmonics in voltage synthesis using pulse width modulation (PWM), or the like, tend to introduce instability.

To produce high torque within a limited volume, a high pole-count electric motor is useful, particularly for hybrid vehicle applications (e.g., hybrid electric vehicles or the like). An increased pole-count generally increases the fundamental frequency associated with the AC motor, while the switching and sampling frequency associated with the current regulation is generally limited due to limitations of the switching power device and the through-put of the processor. Typically, at maximum speed, the ratio of sampling frequency to fundamental frequency, $f_{samp}/f_{fund}$, can be very small (e.g., smaller than a ratio of about ten (10)).

When this ratio is less than about ten (10), a discrete time domain controller may have a sufficiently pronounced influence on the synchronous frame current regulator. Furthermore, inner current loops associated with the current regulator may incur instability due to digital delays. Sub-harmonics associated with asynchronous PWM become significant when the ratio is lower than about twenty-one (21).

Accordingly, it is desirable to provide methods and systems for controlling an AC motor that stabilize current regulation at increased motor speeds. Additionally, it is desirable to provide methods and systems for current regulation of an AC motor that can operate with an extremely low ratio of sampling frequency to fundamental frequency. Furthermore, other desirable features and characteristics of the present invention will become apparent from the subsequent detailed description and the appended claims, taken in conjunction with the accompanying drawings and the foregoing technical field and background.

SUMMARY OF THE INVENTION

Methods and system are provided for controlling an AC motor including. The AC motor is operable based on a commanded current to produce a stator current. In one embodiment, a method for controlling an AC motor via an inverter is provided including, but not necessarily limited to, determining a delay-compensated offset based on a synchronous frame current, producing a current error based on the synchronous frame current and the commanded current, producing a voltage error based on an anti-windup offset, a cross-coupling term and the current error, the anti-windup offset associated with a pre-determined voltage limit of the inverter, producing a commanded voltage based on the delay-compensated offset and the voltage error, and providing the inverter with the commanded voltage. The synchronous frame current is derived from the stator current.

In another embodiment, a current regulator is provided for controlling an AC motor via a commanded voltage in response to a commanded current. The AC motor is operable to produce a stator current at a fundamental frequency based on the commanded voltage. The current regulator includes, but is not necessarily limited to, an input configured to receive the commanded current and a synchronous frame current, an output configured to provide the commanded voltage, and a processor coupled to the input and the output. The synchronous frame current is based on the stator current. The processor is configured to sample the commanded current and the synchronous frame current at a sampling frequency and produce the commanded voltage based on the commanded current and the synchronous frame current. The commanded voltage is compensated for a delay and an anti-windup offset, where the delay becomes more significant as the ratio of the sampling frequency to the fundamental frequency decreases, and the anti-windup offset is associated with a pre-determined voltage limit.

In another embodiment, a system is provided for controlling an AC motor. The system includes, but is not necessarily limited to, an inverter having an output configured to couple to the AC motor, and a controller coupled to the inverter. The inverter is configured to produce an AC voltage based on a commanded voltage and further configured to drive the AC motor at a fundamental frequency with the AC voltage. The AC motor produces a stator current based on the AC voltage. The controller has a sampling frequency and is configured to produce a commanded voltage based on a commanded current and a synchronous frame current. The commanded voltage is compensated for a delay and an anti-windup offset, where the delay becomes more significant as the ratio of the sampling frequency to the fundamental frequency decreases. The synchronous frame current is based on the stator current, and the anti-windup offset is associated with a pre-determined voltage limit.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely illustrative in nature and is not intended to limit the invention or the application and uses of the invention. Furthermore, there is no intention to be bound by any expressed or implied theory presented in the preceding technical field, background, brief summary or the following detailed description.

Systems, methods, and current regulators are provided for controlling an AC motor via current regulation. In one embodiment, complex vector current regulation with active damping resistance is used to control the AC motor. This current regulation utilizes at least one of current prediction, low-pass filtering, and anti-windup offset to improve control of the AC motor. Although the exemplary systems, current regulators, and methods are described with respect to an AC motor, these systems, current regulators, and methods may also be applied to other electric motors.

Figure 1:
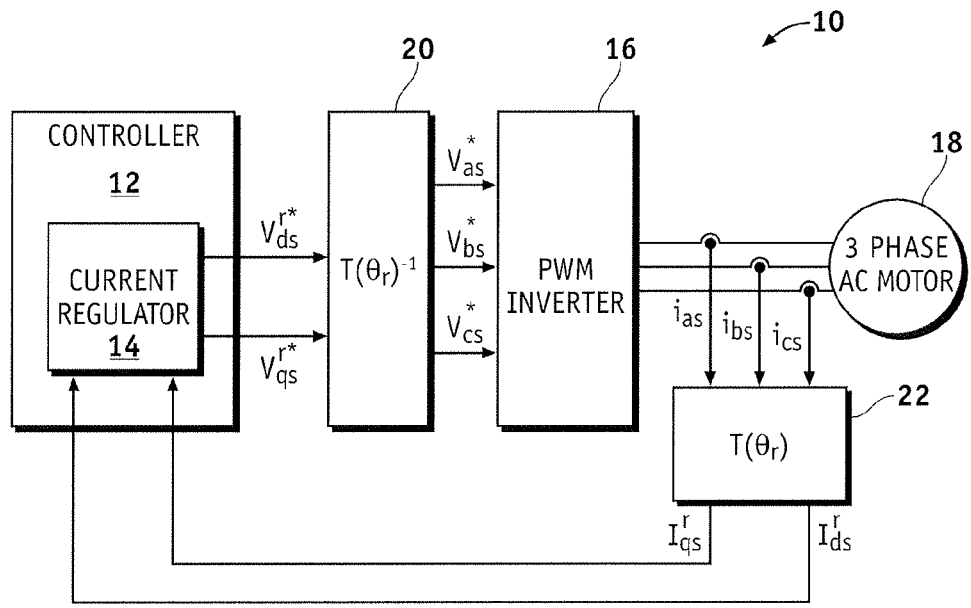
FIG. 1 is a block diagram of a system for controlling an AC motor in accordance with one embodiment of the present invention.

Referring to FIG. 1, a system 10 for controlling an AC motor 18 is shown in accordance with one embodiment of the present invention. The system 10 includes, but is not necessarily limited to, a controller 12 having a synchronous frame current regulator 14, a transformation module 20 having an input coupled to an output of the current regulator 14, and an inverter 16 (e.g., a pulse width modulation (PWM) voltage source inverter) having an input coupled to an output of the transformation module 20 and having an output coupled to the AC motor 18. Generally, the current regulator 14 produces commanded voltages and supplies the commanded voltages to the inverter 16 through transformation module 20. In response to the commanded voltages, the inverter 16 produces AC voltages which are used to drive the AC motor 18. As a result, stator currents are generated in the windings of the AC motor 18.

In one embodiment, the current regulator 14 produces direct current (DC) Cartesian commanded voltages (e.g., a d-axis synchronous frame commanded voltage ($v_{ds}^{r*}$) and a q-axis synchronous frame commanded voltage ($v_{qs}^{r*}$)). The transformation module 20 converts the DC Cartesian commanded voltages to three-phase AC commanded voltages (e.g., a first phase commanded voltage ($v_{as}^*$), a second phase commanded voltage ($v_{bs}^*$), and a third phase commanded voltage ($v_{cs}^*$)) and supplies the three-phase AC commanded voltages to the inverter 16. The inverter 16 produces AC voltages (e.g., three-phase AC voltages), based on a supply potential ($V_{dc}$) and the three-phase commanded voltages, which are used to drive the AC motor 18. The inverter 16 can also vary the amount of AC voltage applied to the AC motor 18 (e.g., the inverter 16 can vary the voltage using PWM), thus allowing the controller 12 to control the AC motor current. For example, the amount of voltage that the inverter 16 applies to the AC motor 18 may be indicated by a modulation index, and the PWM may be established between pre-determined modulation index limits. In one embodiment, asynchronous PWM is utilized to vary the amount of AC voltage applied to the AC motor 18, although other PWM techniques may also be used.

The system 10 may further include a reverse transformation module 22 to transform AC signals (e.g., the three-phase sinusoidal stator currents (e.g., $i_{as}$, $i_{bs}$ and $i_{cs}$)) into DC Cartesian signals (e.g., a d-axis synchronous frame stator current ($i_{ds}^r$) and a q-axis synchronous frame stator current ($i_{qs}^r$)) for use by the current regulator 14. In one embodiment, a detector (not shown), that includes the reverse transformation module 22, may be coupled to the AC motor 18 to sample the AC signals and supply these and other measured quantities (e.g., from a variety of system outputs) to the controller 12. For example, the detector may measure a supply potential (e.g., a battery potential or DC bus voltage ($V_{dc}$)), the phase currents (e.g., a first phase stator current ($i_{as}$), a second phase stator current ($i_{bs}$), and a third phase stator current ($i_{cs}$), although measurement of two of the phase currents may be sufficient for a Y-connected machine without a neutral), a motor speed ($\omega_r$) of the AC motor 18, a rotor phase angle ($\theta_r$) of the AC motor 18, or the like.

The controller 12 executes one or more programs (e.g., to optimize commanded currents for a predetermined control parameter, or the like) to determine operating inputs (e.g., modified commanded currents, commanded voltages, torque commands, or the like) used for controlling the AC motor 18 via the current regulator 14. One or more of the components of the controller 12 may be embodied in software or firmware, hardware, such as an application specific integrated circuit (ASIC), an electronic circuit, a processor (shared, dedicated, or group) and memory that execute one or more software or firmware programs, a combinational logic circuit, and/or other suitable components, or a combination thereof. In one embodiment, the controller 12 is partitioned into one or more processing modules that are associated with one or more of the controller operations. For example, the current regulator 14 may be implemented as one of these processing modules. Although not shown, the controller 12 may include additional modules, such as a commanded current source, a torque module, a field-weakening voltage control module, or the like. Additionally, one or more of the various processing modules of the controller 12, as well as one or more of the operations of the controller 12, may be embodied as separate components of the drive system 10 or incorporated with another component of the drive system 10.

To produce the DC commanded voltages ($v_{ds}^{r*}$, $v_{qs}^{r*}$), the current regulator 14 utilizes several inputs. In one embodiment, commanded currents (e.g., a d-axis synchronous frame commanded current ($i_{ds}^{r*}$) and a q-axis synchronous frame commanded current ($i_{qs}^{r*}$)), clamped voltages due to inverter voltage limits (e.g., a d-axis synchronous frame clamped voltage ($v_{ds\ Clamped}^r$), which is d-axis synchronous frame commanded voltage ($v_{ds}^{r*}$) minus actual d-axis synchronous frame output voltage of inverter, and a q-axis synchronous frame clamped voltage ($v_{qs\ Clamped}^r$), which is q-axis synchronous frame commanded voltage ($v_{qs}^{r*}$) minus actual q-axis synchronous frame output voltage of inverter), and feedforward terms (e.g., a d-axis synchronous frame feedforward voltage ($v_{ds\ Feedforward}^r$) and a q-axis synchronous frame feedforward voltage ($v_{qs\ Feedforward}^r$)) are provided by the controller 12 to the current regulator 14, in addition to the d-axis and q-axis synchronous frame stator currents ($i_{ds}^r$, $i_{qs}^r$).

For example, the controller 12 may retrieve the commanded currents from a commanded current table stored in a memory of the controller 12. The commanded current table is preferably optimized for one or more pre-determined control parameters (e.g., system efficiency) and may be derived from any number of models for optimizing the desired control parameter(s). Additionally, the commanded current table may be pre-determined based on voltage and current limits of the AC motor 18 such that the commanded current source applies an appropriate amount of d-axis and q-axis currents to the AC motor 18 to produce a desired torque (e.g., with high efficiency) and maintain current regulation stability. The inverter voltage limits may be pre-determined based on the supply voltage, and the feedforward terms may be determined by the controller 12 based on the d-axis synchronous frame stator current ($i_{ds}^r$) and q-axis synchronous stator current ($i_{qs}^r$).

Figure 2:
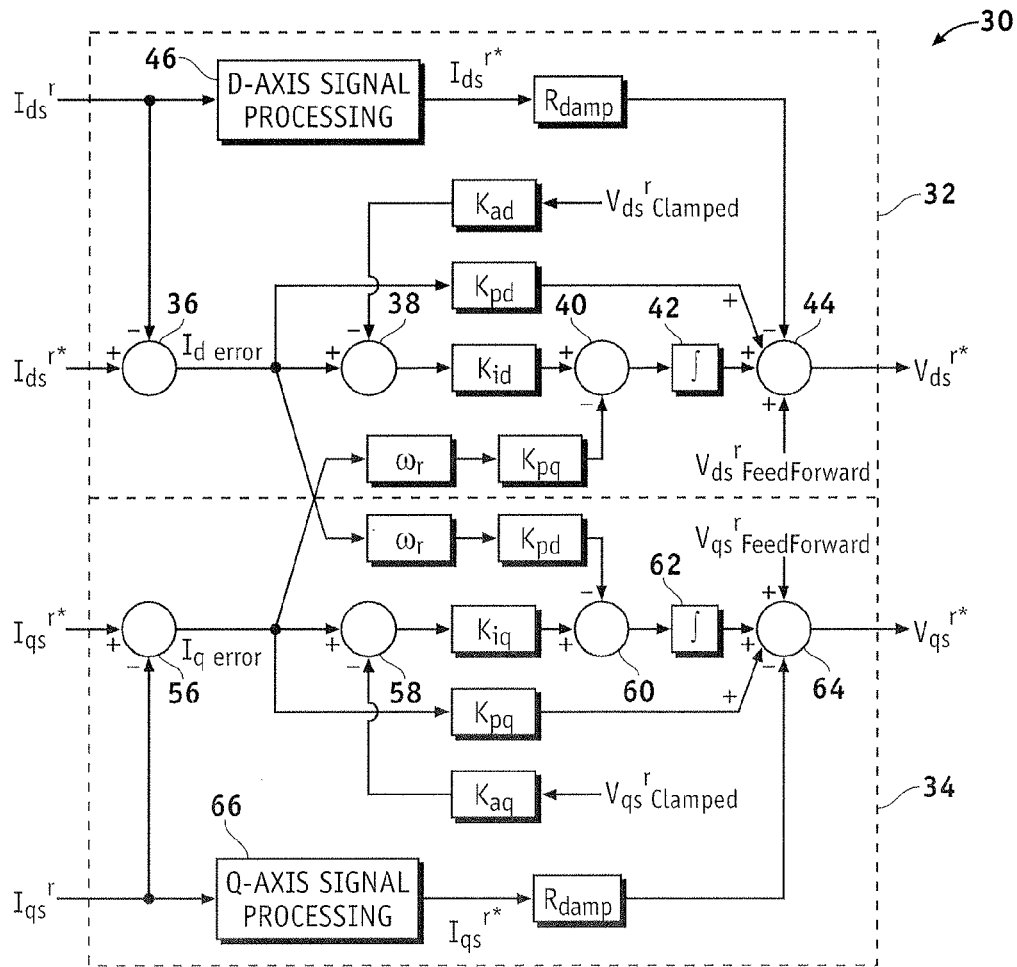
FIG. 2 is a block diagram of a current regulator in accordance with one embodiment.

FIG. 2 is a block diagram of a current regulator 30, such as the current regulator 14 shown in FIG. 1, in accordance with one embodiment. The current regulator 30 is a complex vector current regulator having a d-axis regulating portion 32 and a q-axis regulating portion 34 with cross-coupling of these portions. The d-axis regulating portion 32 receives the d-axis synchronous stator current ($i_{ds}^r$) and d-axis synchronous frame commanded current ($i_{ds}^{r*}$), and the q-axis regulating portion 34 receives the d-axis synchronous stator current ($i_{qs}^{r}$) and the q-axis synchronous frame commanded current ($i_{qs}^{r*}$). Each of the regulating portions 32 and 34 produces a synchronous frame commanded voltage (e.g., the d-axis synchronous frame commanded voltage ($v_{ds}^{r*}$) and the q-axis synchronous frame commanded voltage ($v_{qs}^{r*}$)) based on a voltage error, a delay-compensated offset, a proportional term and the feedforward term. The voltage error is based at least in part on current error, cross-coupling term and anti-windup offset.

To produce the delay-compensated offset, each of the regulating portions 32 and 34 includes, but is not necessarily limited to, a signal processing block (e.g., a d-axis signal processing block (46) and a q-axis signal processing block (66), respectively) having an input for receiving the synchronous stator current (e.g., $i_{ds}^{r}$, $i_{qs}^{r}$, respectively), and a dampening resistance block ($R_{damp}$) having an input coupled to an output of the signal processing block 46, 66, respectively. The d-axis signal processing block 46 outputs a d-axis delay compensated current ($i_{ds}^{r}{}'$), and $R_{damp}$ is applied to $i_{ds}^{r}{}'$ to produce a d-axis delay compensated offset. The q-axis signal processing block 66 outputs a q-axis delay compensated current ($i_{qs}^{r}{}'$), and $R_{damp}$ is applied to $i_{qs}^{r}{}'$ to produce a q-axis delay compensated offset.

In one embodiment, the d-axis signal processing block 46 determines the d-axis delay-compensated current ($i_{ds}^{r}$) from $$i'_{ds}[k] = i^r_{ds}[k] + T_{samp}\frac{v^{r*}_{ds}[k-1] - R_s i^{r*}_{ds}[k] + \omega_r \lambda_q(i^{r*}_{ds}[k], i^{r*}_{qs}[k])}{L_d(i^{r*}_{ds}[k], i^{r*}_{qs}[k])}, \quad \text{(eq. 1)}$$

and the q-axis signal processing block 66 determines the q-axis delay-compensated current ($i_{qs}^{r}$) from $$i'_{qs}[k] = i^r_{qs}[k] + T_{samp}\frac{v^{r*}_{qs}[k-1] - R_s i^{r*}_{qs}[k] - \omega_r \lambda_d(i^{r*}_{ds}[k], i^{r*}_{qs}[k])}{L_q(i^{r*}_{ds}[k], i^{r*}_{qs}[k])} \quad \text{(eq. 2)}$$

In eq. (1) and (2), $\omega_r$ is the fundamental frequency of the AC motor (e.g., the synchronous frequency), $\lambda_d$ and $\lambda_q$ are the d and q-axis stator fluxes, respectively, which are functions of the d-axis and q-axis synchronous frame stator currents, $L_d$ and $L_q$ are the d-axis and q-axis stator inductances, which are also functions of the d-axis and q-axis synchronous frame stator currents, $T_{samp}$ is a sampling period of digital control, and k is a sampling instant (e.g., an integer).

In addition to determining the delay-compensated offsets, each of the regulating portions 32 and 34 combines, via a summing block 36, 56, respectively, the synchronous frame commanded current ($i_{qs}^{r*}$, $i_{qs}^{r*}$, respectively) with the synchronous frame stator current ($i_{ds}^{r}$, $i_{qs}^{r}$, respectively) to produce a current error ($i_{d\,error}$, $i_{q\,error}$, respectively). For example, the summing block 36 subtracts $i_{ds}^{r}$ from $i_{ds}^{r*}$ to produce a d-axis current error ($i_{d\,error}$), and the summing block 56 subtracts $i_{qs}^{r}$ from $i_{qs}^{r*}$ to produce a q-axis current error ($i_{q\,error}$). In this embodiment, the current error is utilized to determine the proportional term and a cross-coupling term, in addition to the voltage error.

For each regulating portion 32 and 34, an anti-windup offset is produced by the application of an anti-windup gain (e.g., a d-axis anti-windup gain ($K_{ad}$) and a q-axis anti-windup gain ($K_{aq}$), respectively) with the clamped voltage ($v_{ds\,Clamped}^{r}$, $v_{qs\,Clamped}^{r}$, respectively). A summing block 38, 58 combines the anti-windup offset with the corresponding current error of the regulating portion 32 and 34. For example, the summing block 38 subtracts a d-axis anti-windup offset from $i_{d\,error}$, and the summing block 58 subtracts a q-axis anti-windup offset from $i_{q\,error}$. An integral gain (e.g., a d-axis integral gain ($K_{id}$) and a q-axis integral gain ($K_{id}$)) is applied to the output of the summing block 38, 58, respectively, and the result is combined with the cross-coupling term via another summing block 40, 60, respectively. For example, the summing block 40 subtracts a q-axis cross-coupling term from the output of $K_{id}$, and the summing block 60 adds a d-axis cross-coupling term from the output of $K_{iq}$. In this embodiment, the q-axis cross-coupling term is produced from the application of the motor speed ($\omega_r$) and a q-axis proportional gain ($K_{pq}$) to the q-axis current error ($i_{q\,error}$), and the d-axis cross-coupling term is produced from the application of the motor speed ($\omega_r$) and a d-axis proportional gain ($K_{pd}$) to the d-axis current error ($i_{d\,error}$).

The outputs of the summing blocks 40 and 60 are integrated by an integrator 42, 62, respectively, to produce the voltage error. A proportional term is produced by the application of a proportional gain (e.g., a d-axis proportional gain ($K_{pd}$) and a q-axis proportional gain ($K_{qd}$)) to the corresponding current error. For example, a d-axis proportional term is produced by the application of $K_{pd}$ to $i_{d\,error}$, and a q-axis proportional term is produced by the application of $K_{qd}$ to $i_{q\,error}$. To produce the d-axis synchronous frame commanded voltage ($v_{ds}^{r*}$), a summing block 44 adds the output of the integrator 42 together with the output of $K_{pd}$ and $v_{ds\,Feedforward}^{r}$ and subtracts the d-axis delay-compensated offset. To produce the q-axis synchronous frame commanded voltage ($v_{qs}^{r*}$), a summing block 64 adds the output of the integrator 62 together with the output of $K_{pq}$ and $v_{qs\,Feedforward}^{r}$ and subtracts the q-axis delay-compensated offset.

Figure 3:
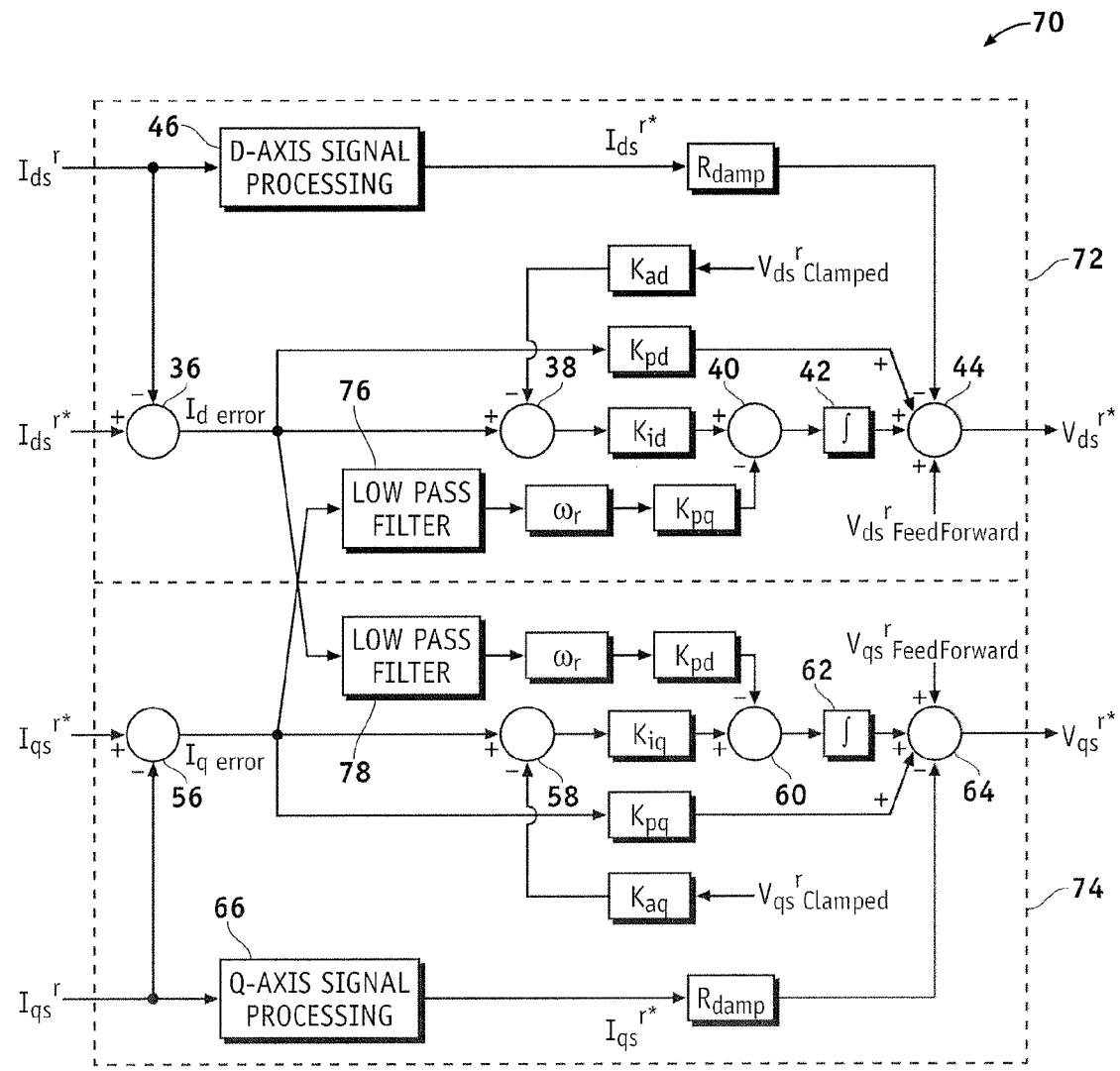
FIG. 3 is a block diagram of a current regulator in accordance with another embodiment of the present invention.

FIG. 3 is a block diagram of a current regulator 70 in accordance with another embodiment of the present invention. Referring to FIGS. 2 and 3, the current regulator 70 has similar components as the current regulator 30 with the addition of low-pass filters 76 and 78 to produce filtered cross-coupling terms. For example, a first low-pass filter 76 filters $i_{q\,error}$ prior to the application of $\omega_r$ and $K_{pd}$, and a second low-pass filter 78 filters $i_{d\,error}$ prior to the application of $\omega_r$ and $K_{pq}$.

In implementation, the digitally sampled currents (e.g., $i_{as}$, $i_{bs}$, $i_{cs}$) may have noise combined with the real current values as a result of electronic noise from a current sensor, electronic circuits, PWM ripple, or the like. To mitigate the potential degradation of current control dynamics due to the noise in sampled current(s), the low-pass filters 76 and 78 are introduced into the cross-coupling paths of the current regulator 70 to filter such noise.

When the ratio of sampling frequency to fundamental frequency is less than about 21, sub-harmonics resulting from asynchronous PWM may become significant in conventional current regulators. The complex vector current regulator 30, 70 provides an even performance over a wide frequency range and has improved robustness to parameter variation and sub-harmonic disturbance. The low-pass filters 76 and 78 additionally minimize potential degradation from noise in current sensing. With high pole count AC motors, the increased pole count may result in a small ratio (e.g., less than about ten (10)) of sampling frequency to fundamental frequency. In the event that the ratio of sampling frequency to fundamental frequency decreases (e.g., as the motor speed increases) beyond a small value (e.g., less than about ten (10)), instabilities that may occur at high speeds are secured with the delay-compensated offset. For example, the signal processing blocks 46 and 66 compensates for delay that may be introduced by digital implementation of the controller 12.

Figure 4:
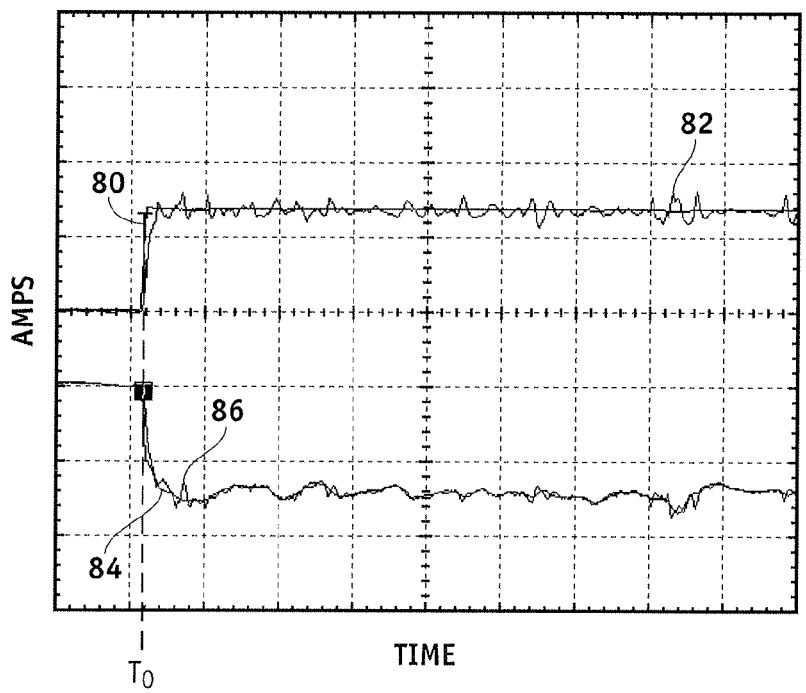
FIG. 4 is plot of commanded currents and actual currents illustrating current regulation in accordance with one embodiment.

FIG. 4 is a plot of commanded currents 80, 84 and actual currents 82, 86 illustrating current regulation in accordance with the embodiment of FIG. 2. Referring to FIGS. 2 and 4, the controller 12 and current regulator 30 utilize asynchronous PWM, in this embodiment, with a ratio of sampling frequency, or switching frequency, to the fundamental frequency of about six (6). A q-axis synchronous frame commanded current 80 (e.g., $i_{qs}^{r*}$), a sampled q-axis synchronous frame stator current 82 (e.g., $i_{qs}^{r}$), a d-axis synchronous frame commanded current 84 (e.g., $i_{ds}^{r*}$), and a sampled d-axis synchronous frame stator current 86 (e.g., $i_{ds}^{r}$) are shown as a function of time. At a time $T_0$, the d-axis and q-axis synchronous frame current commands change stepwise in response to a step torque command. The d-axis and q-axis synchronous frame stator currents 86, 82 track the d-axis and q-axis synchronous frame commanded currents 84, 80, respectively, using the current regulator 30 even though the ratio is extremely low.

Figure 5:
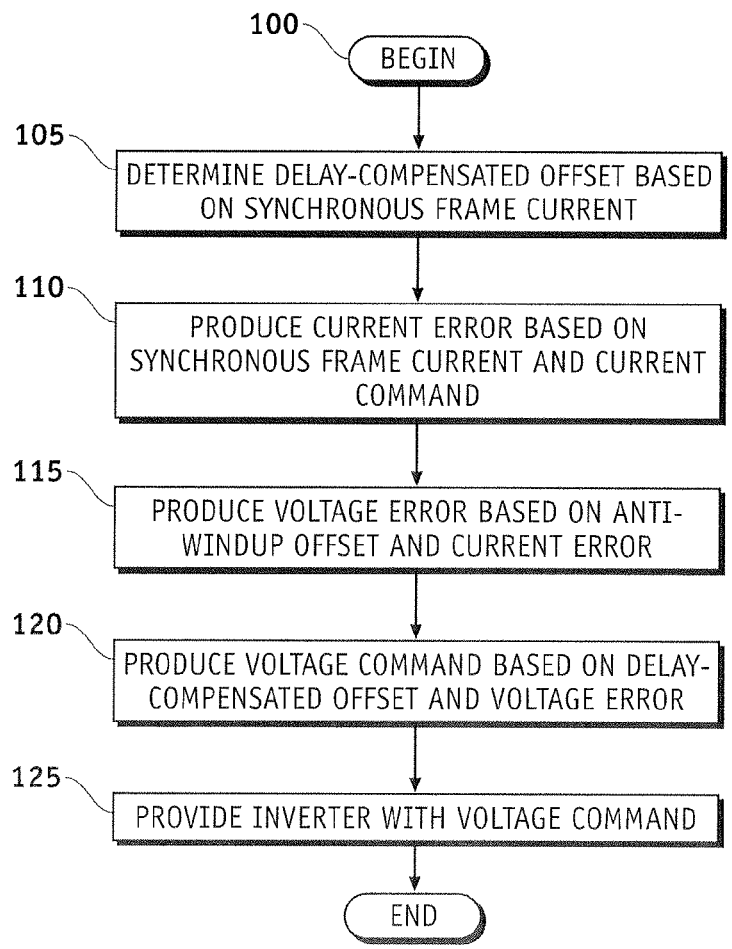
FIG. 5 is a flow diagram of a method for controlling an AC motor in accordance with an exemplary embodiment of the present invention.

FIG. 5 is a flow diagram of a method 100 for controlling an AC motor in accordance with an exemplary embodiment of the present invention. The AC motor is operable based on a commanded current to produce a stator current. A delay-compensated offset is determined based on a synchronous frame current, as indicated at step 105. The synchronous frame current is derived from the stator current. In one embodiment, the inverter has a sampling period and a damping resistance, and a delay-compensated current is predicted based on the sampling period and the synchronous frame current. The delay-compensated offset is then determined based on the delay-compensated current and the damping resistance.

In one embodiment, referring to FIGS. 1, 2, and 5, the AC motor 18 is operable based on a d-axis commanded current (e.g., $i_{ds}^{r*}$) and a q-axis commanded current (e.g., $i_{qs}^{r*}$). In this embodiment, a d-axis delay-compensated current (e.g., $i_{ds}^{r'}$) is predicted based on the sampling period (e.g., $T_{samp}$) and the d-axis synchronous frame current (e.g., $i_{ds}^{r}$), and a q-axis delay-compensated current (e.g., $i_{qs}^{r'}$) is predicted based on the sampling period and a q-axis synchronous frame current (e.g., $i_{qs}^{r}$). A d-axis delay-compensated offset is determined based on the d-axis delay-compensated current and the damping resistance (e.g., $R_{damp}$), and a q-axis delay-compensated offset is determined based on the q-axis delay-compensated current and the damping resistance. In another embodiment, the d-axis delay-compensated current is calculated based on the d-axis synchronous frame current and a first sampling factor, and the q-axis delay-compensated current is calculated based on the q-axis synchronous frame current and a second sampling factor. The first sampling factor is based on a q-axis stator flux (e.g., $\lambda_q$) of the AC motor 18 and a d-axis stator inductance (e.g., $L_d$) of the AC motor, and the second sampling factor is based on a d-axis stator flux (e.g., $\lambda_d$) of the AC motor and a q-axis stator inductance (e.g., $L_q$) of the AC motor. The q-axis stator flux, the d-axis stator flux, the d-axis stator inductance, and the q-axis stator inductance may each be a function of the d-axis commanded current and the q-axis commanded current.

In a digital implementation, for example, the d-axis delay-compensated current ($i_{ds}^{r'}[k]$) is calculated from $$i_{ds}^{r'}[k] = i_{ds}^{r}[k] + T_{samp} \frac{v_{ds}^{r*}[k-1] - R_s i_{ds}^{r*}[k] + \omega_r \lambda_q(i_{ds}^{r*}[k], i_{qs}^{r*}[k])}{L_d(i_{ds}^{r*}[k], i_{qs}^{r*}[k])},$$

and the q-axis delay-compensated current ($i_{qs}^{r'}[k]$) is calculated from $$i_{qs}^{r'}[k] = i_{qs}^{r}[k] + T_{samp} \frac{v_{qs}^{r*}[k-1] - R_s i_{qs}^{r*}[k] - \omega_r \lambda_d(i_{ds}^{r*}[k], i_{qs}^{r*}[k])}{L_q(i_{ds}^{r*}[k], i_{qs}^{r*}[k])}.$$

In this example, $i_{ds}^{r*}[k]$ is the d-axis commanded current, $i_{ds}^{r}[k]$ is the d-axis synchronous frame current produced based on the d-axis commanded current, $i_{qs}^{r*}[k]$ is the q-axis commanded current, $i_{qs}^{r}[k]$ is the q-axis synchronous frame current produced based on the q-axis commanded current, $T_{samp}$ is the sampling period, $v_{ds}^{r*}[k-1]$ is the d-axis commanded voltage based on $i_{ds}^{r*}[k-1]$, $v_{qs}^{r*}[k-1]$ is the q-axis commanded voltage based on $i_{qs}^{r*}[k-1]$, $R_s$ is the equivalent stator resistance of the AC motor 18, $\omega_r$ is the fundamental frequency of the AC motor, $\lambda_d(i_{ds}^{r*}[k], i_{qs}^{r*}[k])$ is the d-axis stator flux of the AC motor, $\lambda_q(i_{ds}^{r*}[k], i_{qs}^{r*}[k])$ is the q-axis stator flux of the AC motor, $L_d(i_{ds}^{r*}[k], i_{qs}^{r*}[k])$ is the d-axis stator inductance of the AC motor, $L_q(i_{ds}^{r*}[k], i_{qs}^{r*}[k])$ is the q-axis stator inductance of the AC motor, and, k represents the sampling instant (e.g., an integer).

A current error (e.g., $i_{d\ error}$ and $i_{q\ error}$) is produced based on the synchronous frame current and the commanded current, as indicated at step 110. A voltage error is then produced by integrator based on an anti-windup offset and the current error, as indicated at step 115. The anti-windup offset is associated with a clamped voltage (e.g., $v_{ds\ Clamped}^{r}$ and $v_{qs\ Clamped}^{r}$) of the inverter. In one embodiment, a pre-determined gain (e.g., $K_{ad}$ and $K_{aq}$) is applied to the clamped voltage to produce the anti-windup offset, and the anti-windup offset is subtracted from the current error (e.g., via summing blocks 38 and 58).

A commanded voltage is produced based on the delay-compensated offset and the voltage error, as indicated at step 120. In one embodiment, the voltage error (e.g., each of the outputs of the integrators 42 and 62) is combined with a feedforward term (e.g., $v_{ds\ Feedforward}^{r}$ and $v_{qs\ Feedforward}^{r}$, respectively), a proportional term (e.g., the outputs of $K_{pd}$ and $K_{pq}$, respectively), and the delay-compensated offset (e.g., the respective outputs of $R_{damp}$) to produce the commanded voltage (e.g., $v_{ds}^{r*}$ and $v_{qs}^{r*}$, respectively). The current error (e.g., $i_{d\ error}$ and $i_{q\ error}$) is combined with the anti-windup offset (e.g., the outputs of $K_{ad}$ and $K_{aq}$, respectively) to produce a first term, a gain (e.g., $K_{id}$ and $K_{iq}$, respectively) is applied to the first term to produce a second term, the second term is combined (e.g., via the summing blocks 40 and 60, respectively) with a cross-coupling term (e.g., the outputs of $K_{pq}$ and $K_{pd}$, respectively) to produce a third term, and the third term is integrated (e.g., via integrators 42 and 62, respectively) to produce the voltage error. In another embodiment, the q-axis current error (e.g., $i_{q\ error}$) is low-pass filtered to produce the q-axis cross-coupling term (e.g., the output of $K_{pq}$), and the d-axis current error (e.g., $i_{d\ error}$) is low-pass filtered to produce the d-axis cross-coupling term (e.g., the output of $K_{pd}$).

The inverter (e.g., the inverter 16) is then provided with the commanded voltage (e.g., $v_{ds}^{r*}$ and $v_{qs}^{r*}$), as indicated at step 125.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for controlling an alternating current (AC) motor via an inverter, the AC motor operable based on a commanded current to produce a stator current, the method comprising the steps of:
   determining a delay-compensated offset based on a synchronous frame current, the synchronous frame current derived from the stator current;
   producing a current error based on the synchronous frame current and the commanded current;
   producing a voltage error based on an anti-windup offset and the current error, the anti-windup offset associated with a pre-determined voltage limit of the inverter;
   producing a commanded voltage based on the delay-compensated offset and the voltage error; and
   providing the inverter with the commanded voltage.

2. A method according to claim 1, wherein the inverter has a sampling period and a damping resistance, and wherein the step of determining a delay-compensated offset comprises:
   predicting a delay-compensated current based on the sampling period and the synchronous frame current; and
   determining the delay-compensated offset based on the delay-compensated current and the damping resistance.

3. A method according to claim 2, wherein the commanded current comprises a d-axis commanded current and a q-axis commanded current, wherein the delay-compensated current comprises a d-axis delay-compensated current and a q-axis delay-compensated current, wherein the synchronous frame current comprises a d-axis synchronous frame current and a q-axis synchronous frame current, and wherein the step of predicting comprises:
   calculating the d-axis delay-compensated current based on the d-axis synchronous frame current and a first sampling factor, the d-axis synchronous frame current based on the d-axis commanded current, the first sampling factor based on a q-axis stator flux of the AC motor and a d-axis stator inductance of the AC motor; and
   calculating the q-axis delay-compensated current based on the q-axis synchronous frame current and a second sampling factor, the q-axis synchronous frame current based on the q-axis commanded current, the second sampling factor based on a d-axis stator flux of the AC motor and a q-axis stator inductance of the AC motor.

4. A method according to claim 3, wherein the q-axis stator flux, the d-axis stator flux, the d-axis stator inductance, and the q-axis stator inductance are each a function of the d-axis commanded current and the q-axis commanded current.

5. A method according to claim 3, wherein the step of calculating the d-axis delay-compensated current ($i_{ds}^{r}{}'[k]$) comprises calculating $$i_{ds}^{r}{}'[k] = i_{ds}^{r}[k] + T_{samp} \frac{v_{ds}^{r*}[k-1] - R_s i_{ds}^{r*}[k] + \omega_r \lambda_q(i_{ds}^{r*}[k], i_{qs}^{r*}[k])}{L_d(i_{ds}^{r*}[k], i_{qs}^{r*}[k])}; \text{ and}$$

wherein the step of calculating the q-axis delay-compensated current ($i_{qs}^{r}{}'[k]$) comprises calculating $$i_{qs}^{r}{}'[k] = i_{qs}^{r}[k] + T_{samp} \frac{v_{qs}^{r*}[k-1] - R_s i_{qs}^{r*}[k] - \omega_r \lambda_d(i_{ds}^{r*}[k], i_{qs}^{r*}[k])}{L_q(i_{ds}^{r*}[k], i_{qs}^{r*}[k])},$$

wherein $i_{ds}^{r}[k]$ is the d-axis synchronous frame, $i_{qs}^{r}[k]$ is the q-axis synchronous frame current produced, $T_{samp}$ is a sampling period, $v_{ds}^{r*}[k-1]$ is a d-axis commanded voltage based on $i_{ds}^{r*}[k-1]$, $v_{qs}^{r*}[k-1]$ is a q-axis commanded voltage based on $i_{qs}^{r*}[k-1]$, $R_s$ is an equivalent stator resistance of the AC motor, $\omega_r$ is a synchronous frequency of the AC motor, $\lambda_d(i_{ds}^{r*}[k], i_{qs}^{r*}[k])$ is a d-axis stator flux of the AC motor, $\lambda_q(i_{ds}^{r*}[k], i_{qs}^{r*}[k])$ is a q-axis stator flux of the AC motor, $L_d(i_{ds}^{r*}[k], i_{qs}^{r*}[k])$ is a d-axis stator inductance of the AC motor, $L_q(i_{ds}^{r*}[k], i_{qs}^{r*}[k])$ is a q-axis stator inductance of the AC motor, and, k represents an integer.

6. A method according to claim 1, wherein the step of producing a voltage error comprises:
   applying a pre-determined gain to the clamped voltage due to the pre-determined voltage limit of the inverter to produce the anti-windup offset; and
   subtracting the anti-windup offset from the current error.

7. A method according to claim 1, wherein the step of producing the commanded voltage comprises:
   combining the voltage error with a feedforward term, a proportional term, and the delay-compensated offset to produce the commanded voltage, the feedforward term based on a d-axis voltage, the proportional term based on the current error.

8. A method according to claim 1, wherein the commanded current comprises first and second commanded currents, wherein the synchronous frame current comprises first and second synchronous frame currents, wherein the current error comprises first and second current errors, the first current error based on the first commanded current and the first synchronous frame current, the second current error based on the second commanded current and the second synchronous frame current, and wherein the step of producing a voltage error comprises:
   combining the first current error with the anti-windup offset to produce a first term;
   applying a gain to the first term to produce a second term;
   combining the second term with a cross-coupling term to produce a third term, the cross-coupling term based on the second current error; and
   integrating the third term to produce the voltage error.

9. A method according to claim 8, further comprising low-pass filtering the second current error to produce the cross-coupling term.

10. A current regulator for controlling an alternating current (AC) motor via a commanded voltage in response to a commanded current, the AC motor operable to produce a stator current at a fundamental frequency based on the commanded voltage, the current regulator comprising:
   an input configured to receive the commanded current and a synchronous frame current, the synchronous frame current based on the stator current;

an output configured to provide the commanded voltage; and a processor coupled to the input and the output, the processor configured to:

sample the commanded current and the synchronous frame current at a sampling frequency; and produce the commanded voltage based on the commanded current and the synchronous frame current, the commanded voltage being compensated for a delay and an anti-windup offset, the anti-windup offset associated with a pre-determined voltage limit.

11. A current regulator according to claim 10, wherein the processor is further configured to:

predict a delay-compensated current based on the sampling frequency and the synchronous frame current;

determine a delay-compensated offset based on the delay-compensated current and a pre-determined damping resistance; and compensate the commanded voltage for the delay with the delay-compensated offset.

12. A current regulator according to claim 11, wherein the commanded current comprises a d-axis commanded current and a q-axis commanded current, wherein the delay-compensated current comprises a d-axis delay-compensated current and a q-axis delay-compensated current, wherein the synchronous frame current comprises a d-axis current and a q-axis current, and wherein the processor is further configured to:

calculate the d-axis delay-compensated current based on the d-axis current and a first sampling factor, the d-axis current based on the d-axis commanded current, the first sampling factor based on a q-axis stator flux of the AC motor and a d-axis stator inductance of the AC motor; and calculate the q-axis delay-compensated current based on the q-axis current and a second sampling factor, the q-axis current based on the q-axis commanded current, the second sampling factor based on a d-axis stator flux of the AC motor and a q-axis stator inductance of the AC motor.

13. A current regulator according to claim 12, wherein the processor is further configured to:

calculate the d-axis delay-compensated current ($i^r_{ds}{'}[k]$) from $$i^{r'}_{qs}[k] = i^r_{qs}[k] + T_{samp}\frac{v^{r*}_{qs}[k-1] - R_s i^{r*}_{ds}[k] + \omega_r \lambda_q(i^{r*}_{ds}[k], i^{r*}_{qs}[k])}{L_d(i^{r*}_{ds}[k], i^{r*}_{qs}[k])}; \text{ and}$$

calculate the q-axis delay-compensated current ($i^r_{qs}{'}[k]$) from $$i^{r'}_{qs}[k] = i^r_{qs}[k] + T_{samp}\frac{v^{r*}_{qs}[k-1] - R_s i^{r*}_{qs}[k] - \omega_r \lambda_d(i^{r*}_{ds}[k], i^{r*}_{qs}[k])}{L_q(i^{r*}_{ds}[k], i^{r*}_{qs}[k])},$$

wherein $i^r_{ds}[k]$ is the d-axis current, $i^r_{qs}[k]$ is the q-axis current, $T_{samp}$ is a sampling period based on the sampling frequency, $v^{r*}_{ds}[k-1]$ is a d-axis commanded voltage based on $i^{r*}_{ds}[k-1]$, $v^{r*}_{qs}[k-1]$ is a q-axis commanded voltage based on $i^{r*}_{qs}[k-1]$, $R_s$ is an equivalent stator resistance of the AC motor, $\omega_r$ is a synchronous frequency of the AC motor, $\lambda_d(i^{r*}_{ds}[k], i^r_{qs}[k])$ is a d-axis stator flux of the AC motor, $\lambda_q(i^{r*}_{ds}[k], i^r_{qs}[k])$ is a q-axis stator flux of the AC motor, $L_d(i^{r*}_{ds}[k], i^r_{qs}[k])$ is a d-axis stator inductance of the AC motor, $L_q(i^{r*}_{ds}[k], i^r_{qs}[k])$ is a q-axis stator inductance of the AC motor, and, k represents an integer.

14. A current regulator according to claim 11, wherein the processor is further configured to:

produce a current error based on the synchronous frame current and the commanded current;

apply a pre-determined gain to the clamped voltage due to the pre-determined voltage limit to produce the anti-windup offset;

subtract the anti-windup offset from the current error to produce a voltage error; and produce the commanded voltage based on the delay-compensated offset and the voltage error.

15. A current regulator according to claim 14, wherein the commanded current comprises first and second commanded currents, wherein the synchronous frame current comprises first and second synchronous frame currents, wherein the current error comprises first and second current errors, the first current error based on the first commanded current and the first synchronous frame current, the second current error based on the second commanded current and the second synchronous frame current, and wherein the processor is further configured to:

combine the first current error with the anti-windup offset to produce a first term;

apply a gain to the first term to produce a second term;

combine the second term with a cross-coupling term to produce a third term, the cross-coupling term based on the second current error; and integrate the third term to produce the voltage error.

16. A current regulator according to claim 15, wherein the processor comprises a low-pass filter for filtering the second current error to produce the cross-coupling term.

17. A system for controlling an alternating current (AC) motor, the system comprising:

an inverter having an output configured to couple to the AC motor, the inverter configured to produce an AC voltage based on a commanded voltage and further configured to drive the AC motor at a fundamental frequency with the AC voltage, the AC motor producing a stator current based on the AC voltage; and a controller coupled to the inverter, the controller having a sampling frequency and configured to produce a commanded voltage based on a commanded current and a synchronous frame current, the commanded voltage being compensated for a delay and an anti-windup offset, the synchronous frame current based on the stator current, the anti-windup offset associated with a pre-determined voltage limit.

18. A system according to claim 17, wherein the inverter is an asynchronous pulse width modulation (PWM) inverter having an input coupled to the controller.

19. A system according to claim 18, wherein the AC motor has a pole count greater than about six.

20. A system according to claim 17, wherein the ratio of the sampling frequency to a fundamental frequency is less than about twenty-one.

* * * * *